(12) United States Patent
Terashima

(10) Patent No.: US 6,515,689 B1
(45) Date of Patent: Feb. 4, 2003

(54) CONTROL APPARATUS

(75) Inventor: Masayuki Terashima, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/349,093

(22) Filed: Jul. 8, 1999

(30) Foreign Application Priority Data

Jul. 10, 1998 (JP) .............................. 10-195870

(51) Int. Cl.$^7$ ............................ G06F 3/033; H04N 5/232
(52) U.S. Cl. ........................ 345/856; 345/861; 345/771; 345/157; 348/211
(58) Field of Search .................... 345/856, 861, 345/859, 860, 863, 771, 764, 839, 846, 773, 700, 157, 161, 163, 156, 173; 348/211, 143, 169

(56) References Cited

U.S. PATENT DOCUMENTS

| | | | | |
|---|---|---|---|---|
| 3,984,628 A | * | 10/1976 | Sharp ........................ 348/211 |
| 5,075,673 A | * | 12/1991 | Yanker ........................ 345/163 |
| 5,515,099 A | * | 5/1996 | Cortjens et al. ........ 348/211 X |
| 5,764,873 A | * | 6/1998 | Magid et al. ................ 345/769 |
| 5,977,970 A | * | 11/1999 | Amro et al. ............ 345/157 X |
| 6,061,055 A | * | 5/2000 | Marks .................... 348/169 X |
| 6,219,032 B1 | * | 4/2001 | Rosenberg et al. ......... 345/157 |

* cited by examiner

Primary Examiner—Raymond J. Bayerl
(74) Attorney, Agent, or Firm—Birch, Stewart, Kolasch & Birch, LLP

(57) ABSTRACT

A field frame and a mouse pointer are displayed on a display of a personal computer. The mouse pointer is moved in the field frame by means of a mouse in order to output movement commands in accordance with a vector starting at the center of the field frame and ending at the mouse pointer. Thus, the moving direction and speed of an object of control can be designated only by moving the mouse pointer in the field frame.

12 Claims, 5 Drawing Sheets

CONTROL APPARATUS

BACKGROUND OF THE INVENTION

1. Field of the Invention

The present invention relates generally to a control apparatus, and more particularly to a control apparatus that outputs the same movement commands as a joystick.

2. Description of Related Art

Conventionally, there is a method for outputting the same commands as a joystick to an object of control by means of a personal computer and a mouse. More specifically, a plurality of control buttons are displayed as icons on a display of the personal computer as shown in FIG. 6. A pointer 1 is moved onto a desired control button with the mouse, and the control button is clicked to output a movement command as if a joystick is tilted in a direction by a degree corresponding to the clicked button.

The conventional method, however, has the following disadvantages. The moving direction and the speed can only be designated according to the control buttons, and thus, it is impossible to finely adjust the direction and the speed. Moreover, the pointer 1 must be moved to another control button each time the direction and the speed are changed, and hence it is impossible to operate the mouse while looking at the object of control all the time. Furthermore, the personal computer is not as easy to operate as the joystick.

SUMMARY OF THE INVENTION

In view of the foregoing, it is an object of the present invention to provide a control apparatus, which is able to finely adjust the direction and the speed by moving a pointer on a display and is as easy to operate as the joystick.

To achieve the above-mentioned object, the present invention is directed to a control apparatus, comprising: a display for displaying a field frame and a pointer; an input device for moving the pointer on the display; and an output device for outputting a command to move an object of control only when the pointer is positioned in the field frame, the output device outputting the command in accordance with a vector starting at a center of the field frame and ending at a position of the pointer.

According to the present invention, the field frame and the pointer are displayed on the display. When the pointer is moved within in the field frame on the display, the output device outputs the movement commands in accordance with the vector starting at the center of the field frame and ending at the position of the pointer. More specifically, the moving direction and speed of the object of control can be designated only by moving the pointer in the field frame. There is no necessity of clicking the command input means every time a movement command is outputted, and it is possible to finely adjust the moving direction and speed of the object of control.

According to the present invention, a picture of a joystick, corresponding to the vector starting at the center of the field frame and ending at a position of the pointer, is displayed in the field frame. The visual effects are such that the operator feels as if he or she was operating the joystick.

The object of control may be a remote control pan head comprising a panning apparatus and a tilting apparatus, and the command from the output device is used to drive the panning apparatus and the tilting apparatus at a speed ratio corresponding to a direction of the vector.

Preferably, when a control mode is set in response to a predetermined command while the pointer is positioned in the field frame, the pointer is prohibited from exiting the field frame and a shape of the pointer is changed; and when the control mode is cancelled in response to a predetermined command, the shape of the pointer is returned to an original shape and the pointer is allowed to exit the field frame.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
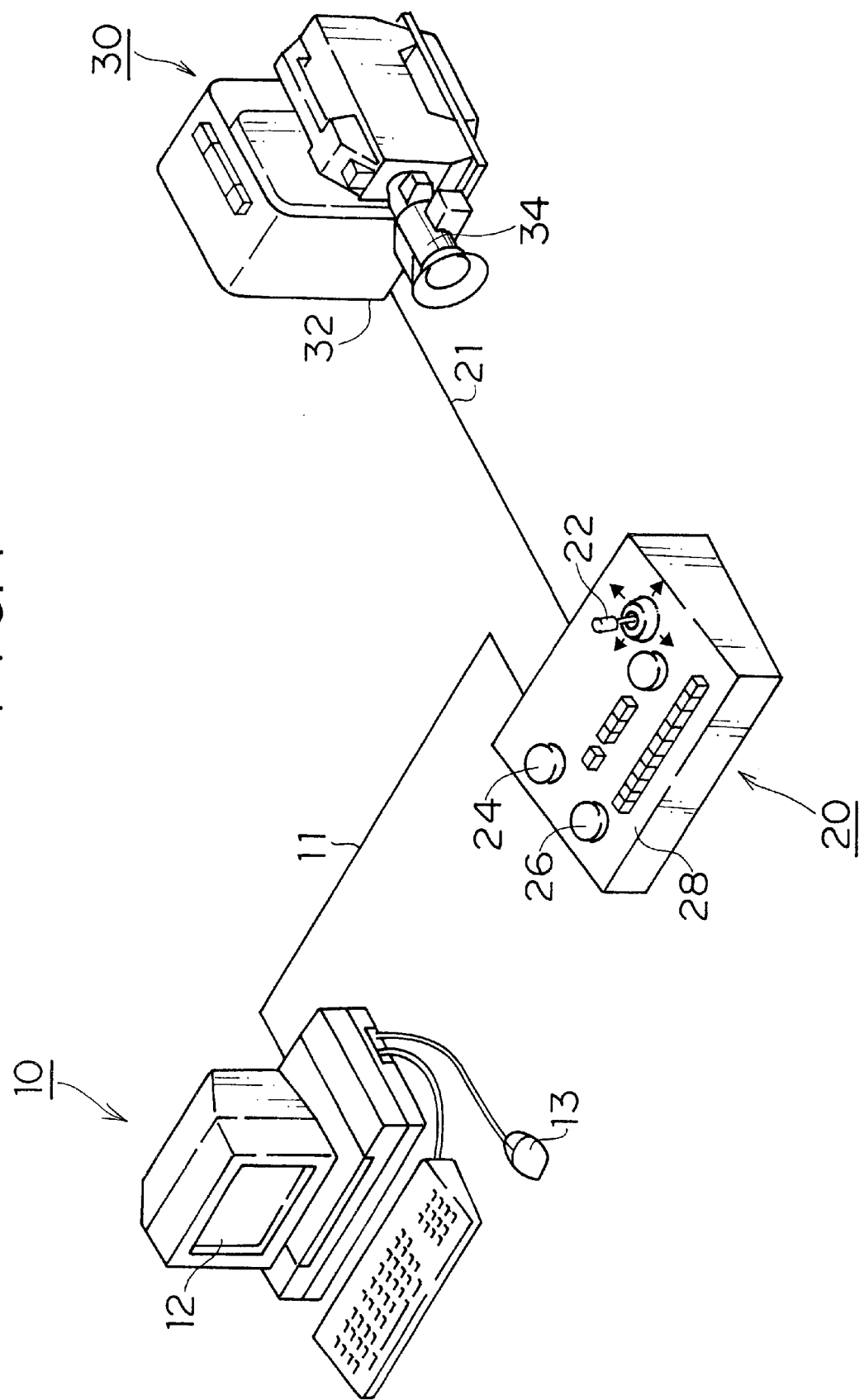
FIG. 1 is a schematic view showing a system to which a control apparatus according to the present invention is applied.

FIG. 1 is a schematic view showing a system to which a control apparatus according to the present invention is applied.

In FIG. 1, reference numeral 10 is a control apparatus (a personal computer) according to the present invention; 20 is a control unit; and 30 is an imaging apparatus including a camera 34 and a remote control panning head 32. The personal computer 10 is connected to the control unit 20 through a serial communication cable 11. The control unit 20 is connected to the imaging apparatus 30 through a multiple cable 21.

The control unit 20 has a joystick 22 for designating a panning angle and a tilting angle of the camera 34 as is well known, a focus dial 24 for designating a focusing position of the camera 34, a zoom dial for designating a zooming position of the camera 34, a button group 28 for selecting appropriate shot information from previously-stored multiple pieces of shot information to obtain a desired shot. Each piece of shot information is composed of information indicating the panning angle, the tilting angle, the focusing position and the zooming position of the camera 34. The shot information is stored in a memory of the control unit 20 in response to the designation of a shot number and a registration.

Signals corresponding to the operated amount of the joystick 22, the focus dial 24, the zoom dial 26, etc. are supplied to a central processing unit (CPU) in the control unit 20. The CPU integrates the inputted signals and converts them into positional data. More specifically, when the joystick 22 is tilted horizontally, the CPU obtains positional data (the panning angle data), which varies according to the tilting angle of the joystick 22. When the joystick 22 is tilted vertically, the CPU obtains positional data (the tilting angle data), which varies according to the tilting angle of the joystick 22. Likewise, the CPU obtains focusing position data and zooming position data in response to the operation of the focus dial 24 and the zoom dial 26.

Then, the panning angle data, the tilting angle data, the focusing position data and the zooming position data are converted into analog signals (voltage signals), which are sent to the imaging apparatus 30 through the multiple cable 21. The imaging apparatus 30 has the remote control panning head 32, which has a panning drive part and a tilting drive part (not shown). The analog signals representing the panning angle and the tilting angle are applied to the panning drive part and the tilting drive part. Thus, the analog signals are used to control the remote control panning head 32. Similarly, the analog signals representing the focusing position and the zooming position are supplied to a focusing drive part and a zooming drive part of the camera 34 in the imaging apparatus 30. Thus, the analog signals are used to drive a focus lens and a zoom lens of the camera 34.

If a shot number is selected by operating the button group 28, the corresponding shot information is read from the memory. The read shot information is converted into analog signals, which are sent to the imaging apparatus 30 through the multiple cable 21.

The personal computer 10 is used for the same operation as the control unit 20. The panning angle data, the tilting angle data, the focusing position data and the zooming position data are outputted to the control unit 20 through the serial communication cable 11 in accordance with the operation of the personal computer 10. The control unit 20 converts these data into analog signals, which are sent to the imaging unit 30 through the multiple cable 21. The control signals may also be outputted directly to the imaging apparatus 30 without going through the control unit 20.

Figure 2:
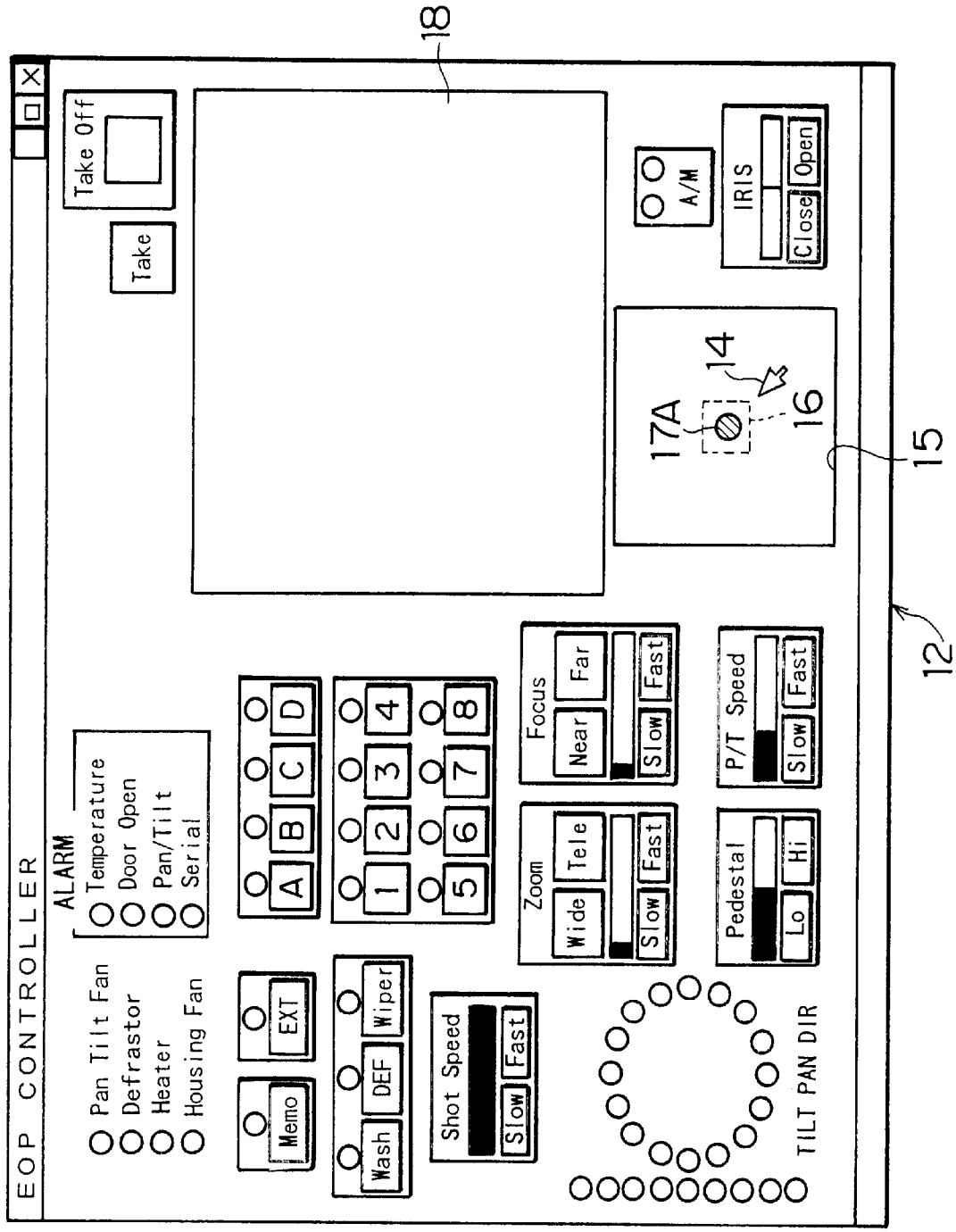
FIG. 2 is a view showing a preferred embodiment of an operation picture on a display of a personal computer during the control of an imaging apparatus.

FIG. 2 is a view showing a preferred embodiment of an operation screen on a display 12 of the personal computer 10 during the control of the imaging apparatus 30.

As shown in FIG. 2, a variety of control buttons is displayed on the display 12. The control buttons function similarly to the dials and the buttons of the control unit 20. The operation of the control buttons remotely controls the imaging apparatus 30. To operate the control buttons, a mouse 13 (see FIG. 1) is operated to move a mouse pointer 14 to a desired control button and click the control button.

A description will be given of the case where the same commands (the panning and tilting angles) as the joystick in FIG. 1 are outputted.

As shown in FIG. 2, a field frame 15 for panning and tilting is provided on the operation screen on the display 12. An insensitive area 16 of a virtual joystick is provided at the center of the field frame 15. While the joystick outputs no command, the displayed joystick 17 (a knob 17A of the joystick) is positioned in the insensitive area 16. In FIG. 2, reference numeral 18 indicates a display area for an image captured by the imaging apparatus 30. If the display 12 receives an image signal from the imaging apparatus 30, the image can be displayed in the display area 18. This eliminates the necessity of providing an additional monitor apparatus, and therefore, an operator can enter a variety of commands while looking at the image displayed in the display area 18.

A description will now be given of the joystick operation on the display 12 with reference to FIGS. 3 and 4(A) and 4(B).

Figure 3:
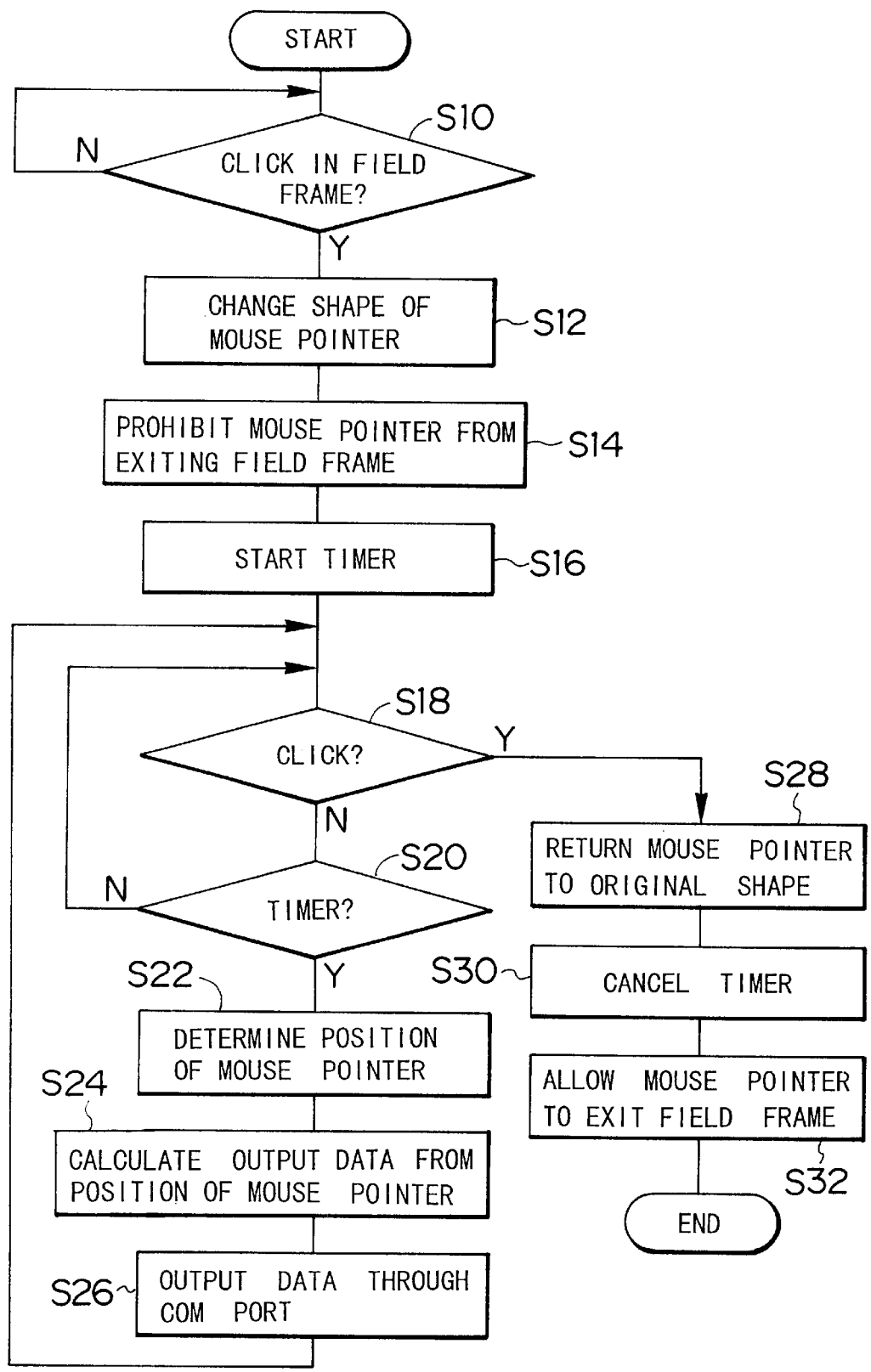
FIG. 3 is a flow chart showing the processing procedure for a joystick operation on the display.

It is determined whether the mouse 13 has been clicked while the mouse pointer 14 is positioned in the field frame 15 (S10 in FIG. 3). If the mouse 13 has been clicked, a joystick operation mode is set and the shape of the mouse pointer 14 is changed (S12). More specifically, the regular mouse pointer 14 represents an arrow (see FIG. 4(A)), while the mouse pointer 14' at the joystick operation mode represents a hand (see FIG. 4(B)). The hand shaped mouse pointer 14' is prohibited from exiting the field frame (S14).

Then, started is a timer for outputting the panning and tilting angle data in a predetermined cycle (S16). Then, it is determined whether the mouse 14 has been clicked again (S18). If the mouse 14 has not been clicked, after a predetermined period passes (S20), the position of the mouse pointer 14' is determined (S22). Then, the output data is calculated from the position of the mouse pointer 14' (S24).

Figure 4:
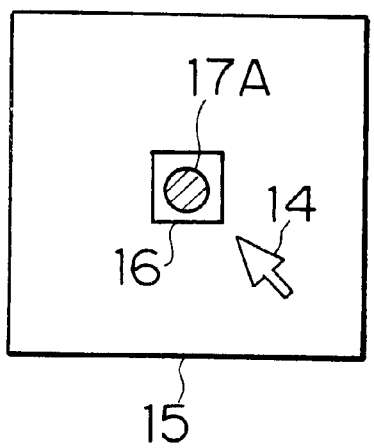
FIGS. 4(A) and 4(B) are views showing an example of a field frame displayed at a joystick control mode and when the joystick control mode is cancelled.
Figure 4:
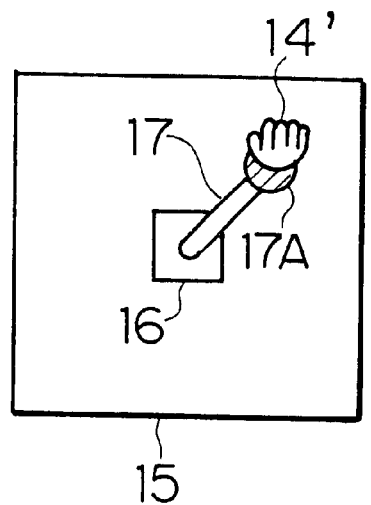

More specifically, the virtual joystick 17 is displayed in the field frame 15 in such a manner that the knob 17A of the virtual joystick 17 can be positioned at the mouse pointer 14' while a base end of the virtual joystick 17 is positioned at the center of the field frame 15 as shown in FIG. 4(B). Then, the output data is calculated in accordance with a vector starting at the center of the field frame 15 (the base end of the virtual joystick 17) and ending at a current position of the mouse pointer 14' (the knob 17A of the virtual joystick 17). According to the output data, the speed ratio between the panning direction and the tilting direction corresponds to the direction of the vector (the tilting direction of the virtual joystick 17) and the speed corresponds to the magnitude of the vector (the tilting angle of the virtual joystick 17).

After the data obtained at S24 is outputted (S26), the process returns to S28. The steps S18 through S26 are repeated until the mouse 13 is clicked. More specifically, the mouse 13 is manipulated to move the mouse pointer 14' in the field frame 15 in the joystick operation mode. Consequently, the data corresponding to the position of the moved mouse pointer 14' (the same data as in the case where the ordinary joystick is operated) are outputted.

On the other hand, if it is determined at S18 that the mouse 13 has been clicked; the mouse pointer 14' is returned to the original mouse pointer 14 (see FIG. 4(A)), the timer is canceled, and the mouse pointer 14 is allowed to exit the field frame 15 (S28–S32).

In this embodiment, the joystick operation mode is set or canceled by clicking the mouse 13 in the state wherein the pointer 14 or 14' is located in the field frame 15. The pointer 14 or 14', however, may also be forcibly positioned in the insensitive area 16 when the mouse is clicked in the state wherein the pointer 14 or 14' is located in the field frame 15. Alternatively, the joystick operation mode may be set or cancelled in response to the click only when the mouse pointer 14 or 14' is located in the insensitive area 16.

Figure 5:
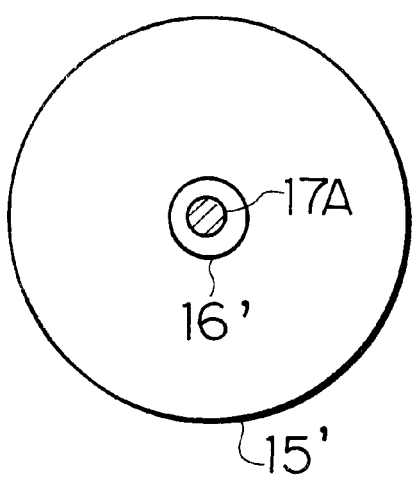
FIGS. 5(A) and 5(B) are views showing an example of a field frame, which is different in shape from the field frame in FIGS. 4(A) and 4(B)
Figure 5:
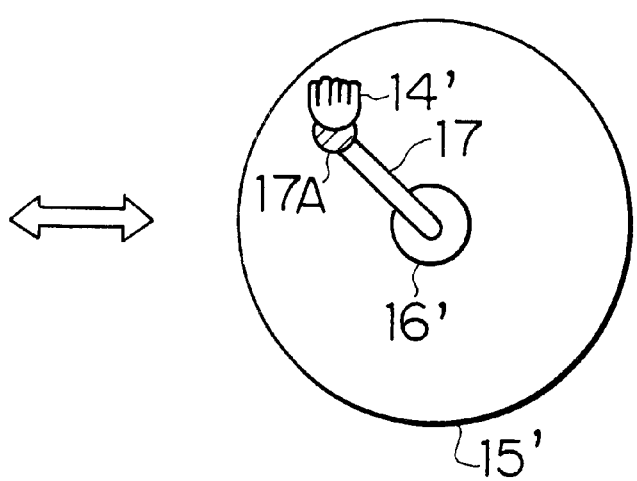
Figure 6:
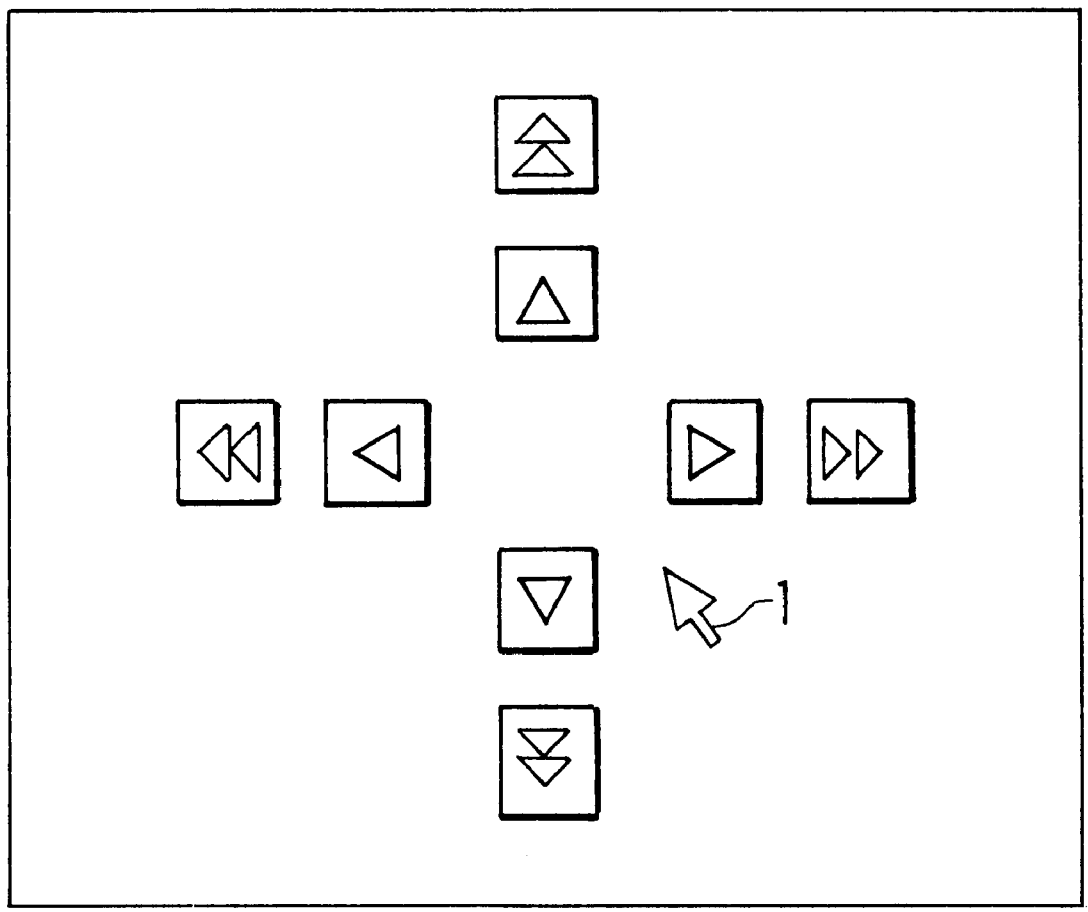
FIG. 6 is an explanation drawing showing a conventional operation method for outputting the same movement commands as a joystick by operating a mouse.

At S10 and S18 in FIG. 3, it is determined whether the mouse 13 has been clicked or not. This invention, however, should not be restricted to this. For example, it is possible to determine whether the mouse 13 is dragged or not. In addition, the field frame 15 and the insensitive area 16 should not always be rectangular in FIGS. 4(A) and 4(B), but the field frame 15' and the insensitive area 16' may also be circular as shown in FIGS. 5(A) and 5(B).

In this embodiment, the mouse is used to move the pointer, but a track ball, a trackpad, or the like may also be used. It is possible to use all kinds of command input means that are designed to move the pointer.

The control apparatus according to the present invention should not always control the imaging apparatus 30, which is provided with the remote control pan head 32. The control apparatus according to the present invention may control anything that can be controlled by the ordinary joystick.

As set forth hereinabove, according to the present invention, the moving direction and speed of the object of control can be designated easily by moving the pointer in the field frame on the display. Moreover, the control apparatus according to the present invention is as easy to operate as the ordinary joystick, and facilitates the fine adjustment of the direction and speed.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A control apparatus, comprising: a display for displaying a field frame and a pointer; an input device for moving the pointer on the display;

an output device for outputting a command to move an object of control only when the pointer is positioned in the field frame, the output device sequentially outputting the command solely by the movement of the input device and without any other input device activation, and the output device outputting the command in accordance with a vector starting at a center of the field frame and ending at a position of the pointer;

when a control mode is set in response to a predetermined command while the pointer is positioned in the field frame, the pointer is prohibited from exiting the field frame and a shape of the pointer is changed; and when the control mode is cancelled in response to a predetermined command, the shape of the pointer is returned to an original shape and the pointer is allowed to exit the field frame.

2. The control apparatus as defined in claim 1, wherein a picture of a joystick corresponding to the vector is displayed in the field frame.

3. The control apparatus as defined in claim 2, wherein the object of control is a remote control pan head comprising a panning apparatus and a tilting apparatus, and the command from the output device is used to drive the panning apparatus and the tilting apparatus at a speed ratio corresponding to a direction of the vector.

4. The control apparatus as defined in claim 1, wherein the object of control is a remote control pan head comprising a panning apparatus and a tilting apparatus, and the command from the output device is used to drive the panning apparatus and the tilting apparatus at a speed ratio corresponding to a direction of the vector.

5. The control apparatus as defined in claim 1, wherein the input device includes at least a command button, the output device outputs the command without any activation of the command button.

6. The control apparatus as defined in claim 5, wherein the input device is a mouse.

7. The control apparatus as defined in claim 5, wherein the input device is a track ball.

8. The control apparatus as defined in claim 1, further comprising a virtual joystick displayed in the field frame, the virtual joystick including a base end positioned at the center of the field frame and a knob positioned at the pointer.

9. The control apparatus as defined in claim 8, wherein the vector starts at the base of the virtual joystick and ends at the knob of the virtual joystick.

10. The control apparatus as defined in claim 1, wherein a speed ratio between a panning direction and a tilting direction of the object of control corresponds to a direction of the vector and a speed of the object of control corresponds to a magnitude of the vector.

11. The control apparatus as defined in claim 1, wherein a timer is started when the pointer is positioned in the field frame for outputting the command in a predetermined cycle.

12. The control apparatus as defined in claim 1, wherein the command includes panning and tilting angle data.

\* \* \* \* \*